United States Patent
Cha et al.

(10) Patent No.: US 9,842,705 B2
(45) Date of Patent: Dec. 12, 2017

(54) FLEXIBLE DYE-SENSITIZED SOLAR CELL USING FIBER

(71) Applicant: Korea Electrotechnology Research Institute, Changwon-si, Gyeongsangnam-do (KR)

(72) Inventors: Seung-il Cha, Changwon-si (KR); Yu-heon Kim, Yangsan-si (KR); Seon-hee Seo, Changwon-si (KR); Dong-yoon Lee, Gimhae-si (KR); Kyu-hyun Haung, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 215 days.

(21) Appl. No.: 14/086,053

(22) Filed: Nov. 21, 2013

(65) Prior Publication Data
US 2014/0076385 A1  Mar. 20, 2014

Related U.S. Application Data

(63) Continuation of application No. PCT/KR2012/002481, filed on Apr. 3, 2012.

(30) Foreign Application Priority Data

Feb. 13, 2012  (KR) .......................... 10-2012-0014185

(51) Int. Cl.
*H01L 31/00* (2006.01)
*H01G 9/20* (2006.01)

(52) U.S. Cl.
CPC ......... *H01G 9/2095* (2013.01); *H01G 9/2027* (2013.01); *H01G 9/2031* (2013.01);
(Continued)

(58) Field of Classification Search
CPC ..... Y02E 10/50; Y02E 10/542; H01G 9/2027; H01G 9/2031; H01G 9/2059; H01G 9/2077; H01G 9/2095
(Continued)

(56) References Cited

U.S. PATENT DOCUMENTS

2003/0230337 A1* 12/2003 Gaudiana et al. ............ 136/256
2009/0133741 A1*  5/2009 Higuchi et al. ............... 136/252
2011/0232743 A1*  9/2011 Yamaguchi et al. .......... 136/256

FOREIGN PATENT DOCUMENTS

KR   10-2005-0064566 A   6/2005
KR   10-2007-0048527 A   5/2007
(Continued)

*Primary Examiner* — Lindsey Bernier
(74) *Attorney, Agent, or Firm* — Park & Associates IP Law, P.C.

(57) ABSTRACT

A flexible dye-sensitized solar cell includes: a fiber layer formed of nanofibers; a conductive electrode layer formed on one side of the fiber layer; a photoelectrode layer formed on the conductive electrode layer; a counter electrode layer formed on the other side of the fiber layer; a sealing member for enclosing the fiber layer, the conductive electrode layer, the counter electrode layer and the photoelectrode layer therein so as to seal said layers from the outside; and an electrolyte infiltrated into the fiber layer. A cell body in which an electrode and a photoelectrode are formed on one surface of the fiber that contains an electrolyte therein and a counter electrode is formed on the other side of the fiber is sealed with a polymer film, thus forming a flexible solar cell having an excellent sealing structure for preventing the electrolyte from leaking out of the cell even when pressure is externally applied.

13 Claims, 4 Drawing Sheets

(52) U.S. Cl.
CPC ......... *H01G 9/2077* (2013.01); *H01G 9/2059* (2013.01); *Y02E 10/50* (2013.01); *Y02E 10/542* (2013.01)

(58) Field of Classification Search
USPC ................................. 136/252, 256, 259, 263
See application file for complete search history.

(56) References Cited

FOREIGN PATENT DOCUMENTS

KR  10-2009-0022181 A  3/2009
WO  WO 2010023860 A1 *  3/2010

\* cited by examiner

FLEXIBLE DYE-SENSITIZED SOLAR CELL USING FIBER

REFERENCE TO RELATED APPLICATIONS

This is a continuation of pending International Patent Application PCT/KR2012/002481 filed on Apr. 3, 2012, which designates the United States and claims priority of Korean Patent Application No. 10-2012-0014185 filed on Feb. 13, 2012, the entire contents of which are incorporated herein by reference.

FIELD OF THE INVENTION

The present invention relates to a flexible dye-sensitized solar cell using fiber, and, more particularly, to a flexible dye-sensitized solar cell using fiber, which is formed by sealing a cell body in which an electrode and a photoelectrode are formed on one side of an electrolyte-containing fiber layer and a counter electrode is formed on the other side of the fiber layer.

BACKGROUND OF THE INVENTION

Generally, a dye-sensitized solar cell is a solar cell chemically generating power using the solar light absorption ability of a dye, and, as shown in FIG. 1, includes an anode 103, a dye, an electrolyte 105, a counter electrode 104, a conductive transparent electrode 102 and a sealing adhesive 106 between lower and upper glass substrates 101.

The anode 103 is made of an N-type oxide semiconductor, such as $TiO_2$, $ZnO$, $SnO_2$ or the like, having a wide bandgap and existing in the form of a nanoporous film, and is adsorbed on the surface thereof with a monomolecular layered dye. When solar light is incident on a solar cell, Fermi energy-leveled electrons in the dye absorb solar energy to be excited to a higher energy level at which electrons are not fully filled.

In this case, the vacant site at a low energy level, from which electrons have left, is refilled with electrons received from ions in an electrolyte. The ions having provided electrons to a dye move to a counter electrode 104 and receive electrons therefrom. In this case, the counter electrode 104, which is a cathode, serves to provide electrons to ions in an electrolyte through an oxidation-reaction reaction occurring on the surface thereof because it acts as a catalyst for the oxidation-reduction reaction of ions in the electrolyte.

Among the constituents of the dye-sensitized solar cell, each of the upper and lower glass substrates 101 is coated with a conductive transparent electrode 102. The conductive transparent electrode 102 is generally made of a fluorine-doped tin oxide (FTO). The reason for this is that the FTO can be stably used for a long time because the reactivity of the FTO with the electrolyte 105 is lowest.

Further, in order to prevent the electrolyte 105 from leaking out of the solar cell, the solar cell is structured such that the conductive transparent electrode 102 is enclosed using a sealing adhesive 106, thus accommodating the electrolyte 105 in a predetermined space.

However, since the upper and lower glass substrates, each of which is coated with FTO, are very expensive, there is a problem in that the price of the dye-sensitized solar cell increases, and thus it is difficult to commercialize the dye-sensitized solar cell.

Further, there is a problem in that the sealing performance of the sealing adhesive 106 is deteriorated by the pressure asymmetrically applied to the dye-sensitized solar cell to form minute gaps, so the electrolyte 106 in the dye-sensitized solar cell is discharged to the outside through the gaps, and moisture is externally introduced into the dye-sensitized solar cell, thereby decreasing the efficiency of the dye-sensitized solar cell.

Meanwhile, since the conductive transparent electrode 102, the sealing adhesive 106 and the lower and upper glass substrates 101 are different from one another in thermal expansion coefficient and thermal conductivity, they easily break or are not easily sealed in a small temperature difference, so the electrolyte in the dye-sensitized solar cell leaks out of the cell, thereby decreasing the efficiency of the dye-sensitized solar cell.

SUMMARY OF THE INVENTION

Accordingly, the present invention has been made to solve the above-mentioned problems, and an object of the present invention is to provide a flexible dye-sensitized solar cell using fiber, which is formed by sealing a cell body in which an electrode and a photoelectrode are formed on one side of an electrolyte-containing fiber layer and a counter electrode is formed on the other side of the fiber layer.

In order to accomplish the above object, an aspect of the present invention provides a flexible dye-sensitized solar cell using fiber, including: a fiber layer formed of nanofibers; a conductive electrode layer formed on one side of the fiber layer; a photoelectrode layer formed on the conductive electrode layer; a counter electrode layer formed on the other side of the fiber layer; a sealing member for enclosing the fiber layer, the conductive electrode layer, the counter electrode and the photoelectrode layer therein so as to seal said layers from the outside; and an electrolyte infiltrated into the fiber layer.

The fiber layer may be formed of nanofibers selected from $TiO_2$, $SiO_2$ and $ZrO_2$.

The fiber layer may be formed of nanofibers having a diameter of 100 to 900 nm, and may have a thickness of 10 to 900 μm.

The conductive electrode layer may be formed of a metal mesh.

The metal mesh may be a stainless steel mesh.

The metal mesh may be coated on the surface thereof with titanium.

The conductive electrode layer may be formed by primarily applying a titanium dioxide paste to one side of the fiber layer and then laminating a metal mesh on the applied titanium dioxide paste.

The titanium dioxide paste may be secondarily applied to the lower surface of the metal mesh to attach the metal mesh to the fiber layer.

The titanium dioxide paste may be heat-treated at a temperature of 450 to 500° C. after being secondarily applied.

The photoelectrode layer may be formed by applying a titanium dioxide paste onto the conductive electrode layer one or more times while a mask is disposed over the conductive electrode layer.

The titanium dioxide paste may be applied to a thickness of 10 to 40 nm with respect to each time.

The titanium dioxide paste may be heat-treated at a temperature of 450 to 500° C. after being applied.

A dye may be infiltrated after the heat treatment

The counter electrode layer may be formed of platinum.

The counter electrode layer may be formed to a thickness of 50 to 500 nm.

The sealing member may be made of polyethylene terephthalate (PET) or polyethylene (PE).

The sealing member may have a thickness of 10 to 500 μm.

The electrolyte may be acetonitrile.

The electrolyte may be infiltrated into the fiber layer by injecting the electrolyte into the fiber layer through a hole formed in the sealing member using an injector.

The conductive electrode layer may be electrically connected with a first terminal electrode protruding from one side of the sealing member.

The counter electrode layer may be electrically connected with a second terminal electrode protruding from the other side of the sealing member.

The second terminal electrode may be a titanium wire.

Therefore, there is an advantage in that a cell body, in which an electrode and a photoelectrode are formed on one side of an electrolyte-containing fiber layer and a counter electrode is formed on the other side of the fiber layer, is sealed with a polymer film, thus forming a flexible solar cell.

According to the present invention, a cell body, in which an electrode and a photoelectrode are formed on one side of an electrolyte-containing fiber layer and a counter electrode is formed on the other side of the fiber layer, is sealed with a polymer film, thus forming a flexible solar cell having an excellent sealing structure for preventing the electrolyte from leaking out of the cell by external pressure.

DETAILED DESCRIPTION OF THE INVENTION

Figure 1:
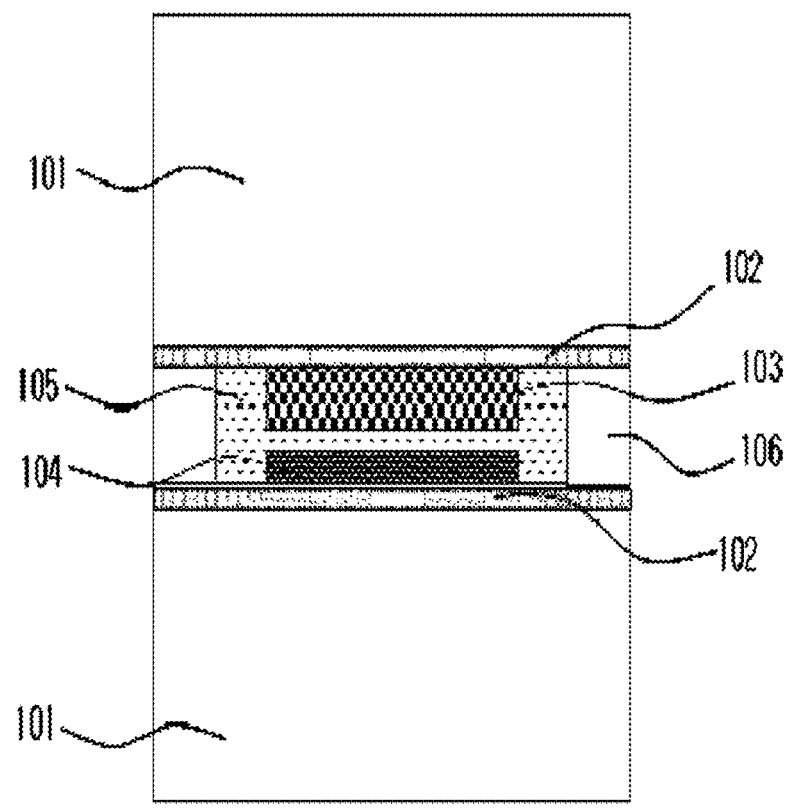
FIG. 1 is a schematic view of a conventional dye-sensitized solar cell.
Figure 3:
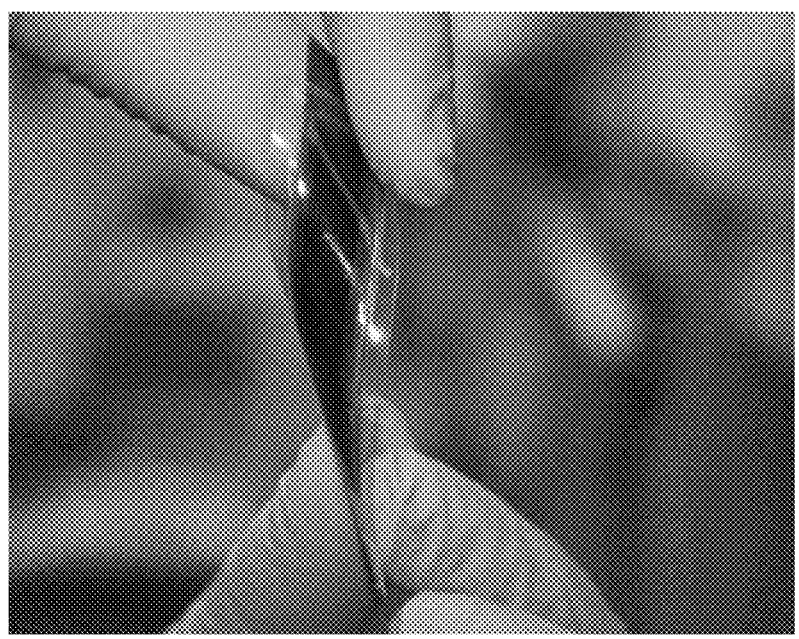
FIG. 3 is a photograph showing the flexibility of the dye-sensitized solar cell according to the present invention.
Figure 4:
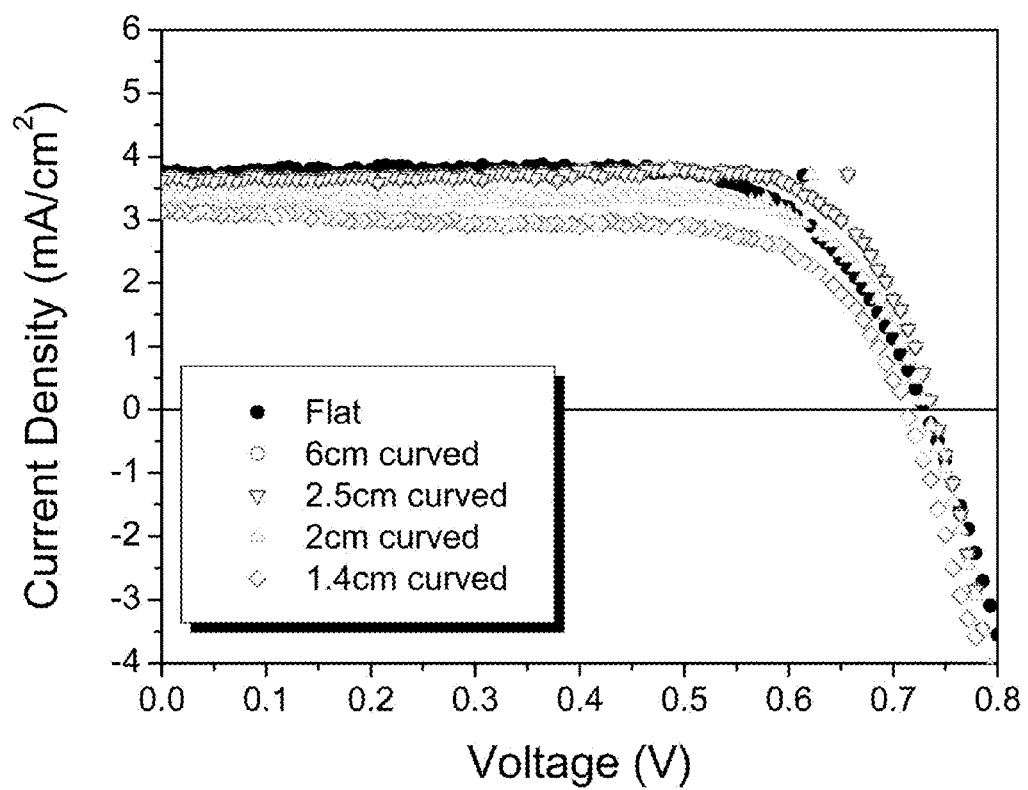
FIG. 4 is a graph showing the current density of the dye-sensitized solar cell with respect to degree of flexion.
Figure 5:
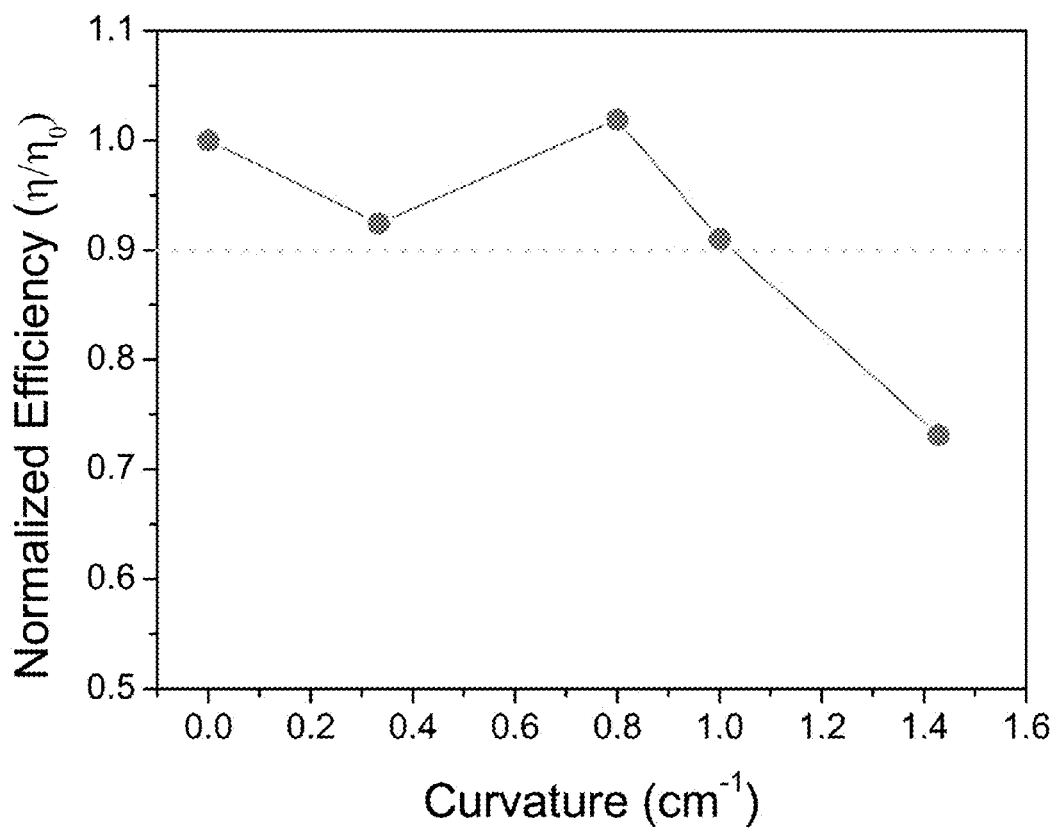
FIG. 5 is a graph showing the efficiency of the dye-sensitized solar cell with respect to curvature (cm-1).

Hereinafter, preferred embodiments of the present invention will be described in detail with reference to the accompanying drawings. FIG. 1 is a schematic view of a conventional dye-sensitized solar cell, FIG. 2 is a schematic view showing the structure of a dye-sensitized solar cell using fiber according to the present invention, FIG. 3 is a photograph showing the flexibility of the dye-sensitized solar cell according to the present invention, FIG. 4 is a graph showing the current density of the dye-sensitized solar cell with respect to degree of flexion, and FIG. 5 is a graph showing the efficiency of the dye-sensitized solar cell with respect to curvature (cm-1).

Figure 2:
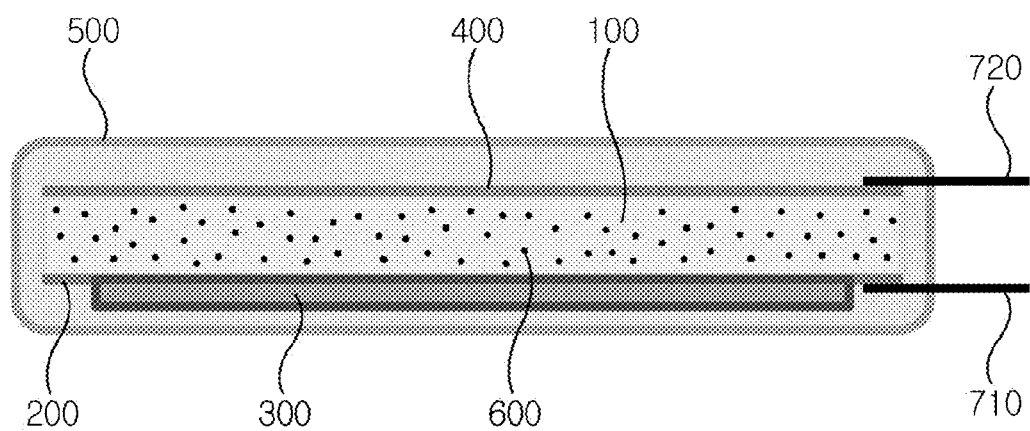
FIG. 2 is a schematic view showing the structure of a dye-sensitized solar cell using fiber according to the present invention.

As shown in FIG. 2, the flexible dye-sensitized solar cell using fiber according to the present invention largely includes a fiber layer 100, a conductive electrode layer 200, a photoelectrode layer 300, a counter electrode 400, a sealing member 500, and an electrolyte 600.

First, a fiber layer 100 is explained.

The fiber layer 100 is formed of nanofibers selected from $TiO_2$, $SiO_2$ and $ZrO_2$. In an embodiment of the present invention, as the fiber layer 100, a glass microfiber filter paper (CHMLAB Group, GF1 grade filter paper) may be used. The thickness of the nanofibers may be about 500 nm, and the fiber layer 100 may be formed to a thickness of about 100 μm. The fiber layer 100 is impregnated with an electrolyte 600, and is enclosed by a sealing member 500 to be isolated from the outside.

A counter electrode layer 400 is formed on the one side of the fiber layer 100. The counter electrode layer 400 is a platinum thin film layer which is formed by applying platinum to one side of a glass paper as the fiber layer 100 to a thickness of 100 nm. In this case, the platinum thin film layer is formed by sputtering or evaporation.

A conductive electrode layer 200 is formed on the other side of the fiber layer 100. The conductive electrode layer 2000 is formed of a stainless steel mesh which is a metal mesh.

In order to form the conductive electrode layer 200, first, a stainless steel mesh, which is a metal mesh, is washed with acetone, ethanol and water, and then dried in an oven at a temperature of 70° C. In this case, the stainless steel mesh is formed of 304 stainless steel (325 meshes).

Thereafter, both sides of the stainless steel mesh are coated with titanium to a thickness of about 300 nm by sputtering. The titanium-coated stainless steel mesh is surface-treated.

Subsequently, a titanium dioxide paste including titanium dioxide ($TiO_2$) particles having a diameter of about 500 nm is primarily applied to a side of the fiber layer 100, the side being opposite to a side provided thereon with the counter electrode layer 400 (platinum thin film layer).

In this state, the surface-treated stainless steel mesh is disposed on the fiber layer 100 primarily coated with the titanium dioxide paste before the titanium dioxide paste is dried, and is then dried in an oven at a temperature of about 70° C. for about 2 hours.

Thereafter, a titanium dioxide paste including titanium dioxide ($TiO_2$) particles having a diameter of about 20 nm is secondarily applied to the upper side of the dried stainless steel mesh disposed on the fiber layer 100.

Finally, the stainless steel mesh secondarily coated with the titanium dioxide paste is heat-treated at a temperature of 480° C. for about 1 hour to attach this stainless steel mesh to the fiber layer 100, thereby forming the conductive electrode layer 200 on one side of the fiber layer 100.

A photoelectrode layer 300 is formed on the lower side of the conductive electrode layer 200. The photoelectrode layer 300 is formed using a titanium dioxide paste.

Specifically, the photoelectrode layer 300 is formed by applying the titanium dioxide paste to the lower side of the conductive electrode layer 200 to a thickness of 20 nm while a mask is disposed over the conductive electrode layer 200. In this case, the photoelectrode layer 300 may be formed by laminating the titanium dioxide paste to a thickness of 20 nm several times.

As described above, the titanium dioxide paste is applied, heat-treated at a temperature of 480° C. for 1 hour, and then immersed into a ruthenium-based N719 dye to form a photoelectrode layer 300 impregnated with the dye.

Next, a sealing member 500 for enclosing the fiber layer 100, the conductive electrode layer 200, the counter electrode layer 400 and the photoelectrode layer 300 therein so as to seal said layers from the outside is formed. The sealing member 500 is made of a transparent polymer film (PET, PE or the like).

In an embodiment of the present invention, the sealing member 500 is formed by applying a PET film having a thickness of about 100 μm using a hot roll coating machine.

Then, a small hole is formed in the sealing member 500, and then a glass paper as the fiber layer 100 is impregnated with acetonitrile as the electrolyte 600 through the hole using an injector.

In this case, a first terminal electrode 710 is formed on the conductive electrode layer 200 by projecting a stainless steel sheet having a predetermined thickness out of the sealing member 500 while electrically connecting this stainless steel sheet with the conductive electrode layer 200, and a second terminal electrode is formed on the counter electrode layer 400 by projecting a titanium wire having a length of about 1 cm and a diameter of 0.1 mm out of the sealing member 500 while electrically connecting this titanium wire with the counter electrode layer 400, thereby completing the flexible dye-sensitized solar cell according to the present invention.

The flexibility of the flexible dye-sensitized solar cell was tested. As a result, it can be ascertained that the flexibility thereof is excellent as shown in FIG. 3.

Further, the current density of the flexible dye-sensitized solar cell with respect to degree of flexion was measured. As a result, it can be ascertained from FIG. 4 that the current density thereof is maintained when the curvature radius thereof is 1.4 cm or more.

Furthermore, from FIG. 5, it can be ascertained that the efficiency thereof is lowered when the curvature radius thereof is less than 1 cm, and that the efficiency thereof is maintained at about 90% when the curvature radius thereof is 1 cm or more. Consequently, it can be ascertained that a flexible dye-sensitized solar cell having a stable efficiency can be obtained when the curvature radium thereof is 1 cm or more.

The present invention relates to a flexible dye-sensitized solar cell using fiber, and, more particularly, to a flexible dye-sensitized solar cell using fiber, which is formed by sealing a cell body, in which an electrode and a photoelectrode are formed on one side of an electrolyte-containing fiber layer and a counter electrode is formed on the other side of the fiber layer, with a polymer film.

What is claimed is:

1. A flexible dye-sensitized solar cell comprising:
   a fiber layer formed of nanofibers;
   a conductive electrode layer formed on a first side of the fiber layer;
   a photoelectrode layer formed on, and in direct contact to, an outer surface of the conductive electrode layer;
   a counter electrode layer formed on, and in direct contact to, a second side of the fiber layer opposite from the first side of the fiber layer;
   a sealing member for enclosing the fiber layer, the conductive electrode layer, the counter electrode layer and the photoelectrode layer therein so as to seal said layers from the outside; and
   an electrolyte infiltrated into the fiber layer,
   wherein the conductive electrode layer is formed of a metal mesh, and the metal mesh is coated on a surface thereof with titanium,
   wherein the fiber layer has a titanium dioxide paste applied directly on the first side of the fiber layer, and the titanium coated metal mesh is laminated directly on the titanium dioxide paste applied surface of the fiber layer;
   wherein the titanium dioxide paste is between the conductive electrode layer and the fiber layer.

2. The flexible dye-sensitized solar cell of claim 1, wherein the fiber layer is formed of nanofibers selected from TiO2, SiO2 and ZrO2 nanofibers.

3. The flexible dye-sensitized solar cell of claim 2, wherein the fiber layer is formed of nanofibers having a diameter of 100 to 900 nm, and has a thickness of 10 to 900 μm.

4. The flexible dye-sensitized solar cell of claim 1, wherein the metal mesh is a stainless steel mesh.

5. The flexible dye-sensitized solar cell of claim 1, wherein the counter electrode layer is formed of platinum.

6. The flexible dye-sensitized solar cell of claim 5, wherein the counter electrode layer is formed to a thickness of 50 to 500 nm.

7. The flexible dye-sensitized solar cell of claim 1, wherein the sealing member is made of polyethylene terephthalate (PET) or polyethylene (PE).

8. The flexible dye-sensitized solar cell of claim 7, wherein the sealing member has a thickness of 10 to 500 μm.

9. The flexible dye-sensitized solar cell of claim 1, wherein the electrolyte is acetonitrile.

10. The flexible dye-sensitized solar cell of claim 9, wherein the electrolyte is infiltrated into the fiber layer by injecting the electrolyte into the fiber layer through a hole formed in the sealing member using an injector.

11. The flexible dye-sensitized solar cell of claim 1, wherein the conductive electrode layer is electrically connected with a first terminal electrode protruding from the sealing member.

12. The flexible dye-sensitized solar cell of claim 11, wherein the counter electrode layer is electrically connected with a second terminal electrode protruding from the sealing member.

13. The flexible dye-sensitized solar cell of claim 12, wherein the second terminal electrode is a titanium wire.

* * * * *